(12) United States Patent
Ge (10) Patent No.: US 12,222,624 B2
(45) Date of Patent: Feb. 11, 2025

(54) DISPLAY SCREEN COMPRISING AN ELECTROCHROMIC MATERIAL LAYER LOCATED IN A BLIND VIA AREA AND DISPLAY DEVICE

(71) Applicants: Huizhou China Star Optoelectronics Display Co., Ltd., Huizhou (CN); TCL China Star Optoelectronics Technology Co., Ltd., Shenzhen (CN)

(72) Inventor: Ru Ge, Huizhou (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/605,064

(22) PCT Filed: Aug. 31, 2021

(86) PCT No.: PCT/CN2021/115596
§ 371 (c)(1),
(2) Date: Oct. 20, 2021

(87) PCT Pub. No.: WO2023/019639
PCT Pub. Date: Feb. 23, 2023

(65) Prior Publication Data
US 2024/0019750 A1     Jan. 18, 2024

(30) Foreign Application Priority Data

Aug. 20, 2021 (CN) .......................... 202110961995.8

(51) Int. Cl.
*G02F 1/157*     (2006.01)
*G02F 1/1337*   (2006.01)
(Continued)

(52) U.S. Cl.
CPC ............ *G02F 1/157* (2013.01); *G02F 1/1337* (2013.01); *G02F 1/1362* (2013.01); *G02F 1/155* (2013.01)

(58) Field of Classification Search
CPC ..... G02F 2001/1635; G02F 2001/1502; G02F 1/1503; G02F 1/1506; G02F 1/1514; G03B 7/00
See application file for complete search history.

(56) References Cited

U.S. PATENT DOCUMENTS

2010/0328328 A1   12/2010   Choi et al.
2013/0222748 A1   8/2013    Zhou et al.
(Continued)

FOREIGN PATENT DOCUMENTS

CN   104749837 A   7/2015
CN   110794604 A   2/2020
(Continued)

*Primary Examiner* — Paul C Lee
(74) *Attorney, Agent, or Firm* — Nathan & Associates; Menachem Nathan (57) ABSTRACT

The present disclosure provides a display screen and a display device. The display screen includes an electrochromic layer located in a blind via area. The electrochromic layer includes a first electrode layer, an electrochromic material layer, and a second electrode layer stacked in sequence. By means of the display screen and the display device of the present disclosure, the blind via area and an under-screen camera can be shielded when a photographing function is disabled, so that the appearance is sightlier, the privacy is protected, and the lighting of the under-screen camera is not affected when the photographing function is enabled.

12 Claims, 3 Drawing Sheets

(51) Int. Cl.
*G02F 1/1362* (2006.01)
*G02F 1/155* (2006.01)

(56) References Cited

U.S. PATENT DOCUMENTS

2016/0349589 A1* 12/2016 Sun .................. G09G 3/2003
2017/0061919 A1* 3/2017 Chen .................. G02F 1/155
2020/0174297 A1* 6/2020 Lim .................. G02F 1/1347
2020/0225522 A1 7/2020 Gao et al.

FOREIGN PATENT DOCUMENTS

| CN | 111308771 A | | 6/2020 | | |
|---|---|---|---|---|---|
| CN | 111445785 A | | 7/2020 | | |
| CN | 211786489 U | * | 10/2020 | | |
| CN | 212905809 U | | 4/2021 | | |
| CN | 112928148 A | * | 6/2021 | ......... | H01L 27/3232 |
| WO | 2014190692 A1 | | 12/2014 | | |

* cited by examiner

DISPLAY SCREEN COMPRISING AN ELECTROCHROMIC MATERIAL LAYER LOCATED IN A BLIND VIA AREA AND DISPLAY DEVICE

FIELD OF INVENTION

The present disclosure relates to display technologies, and more particularly, to a display screen and a display device.

BACKGROUND OF INVENTION

As display screens are becoming intelligent, requirements for integrating a camera into a display screen to realize interaction between human and the display screens are becoming urgent. An under-screen camera technology is to integrate a camera under a display screen. The camera may be used as a basis of a screen interaction technology, and add a value to the screen.

Figure 1:
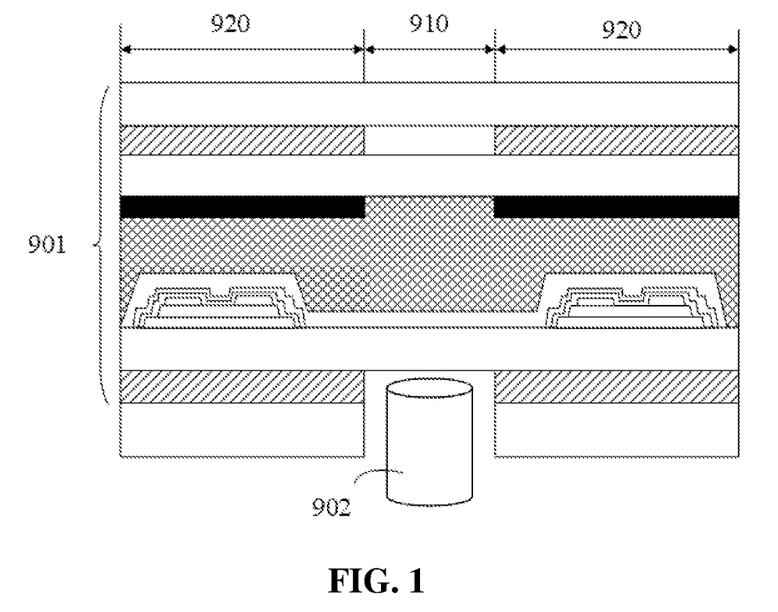
FIG. 1 is a schematic diagram of a structure of a conventional display screen.

FIG. 1 is a schematic diagram of a conventional under-screen camera display device. As shown in FIG. 1, a display screen 901 includes a blind via area 910 penetrable by ambient light and a non-blind via area 920. A camera 902 is disposed under the display screen 901, and corresponds to the blind via area 910.

However, the under-screen camera technology causes the display screen 901 to fail to display images on an entire surface. Furthermore, a camera is the basic configuration for current electronic devices, such as mobile phones and notebook computers, but is very vulnerable, resulting in personal privacy disclosure of a user. Thus, the camera is required to be shielded.

Currently, some camera shielding technologies, such as using a camera shielding device have emerged. The technologies mainly include two types. First is to externally dispose a shielding accessory. A shielding piece is artificially disposed outside the camera to shield the camera. For example, a shield is sticked to cover a camera of a notebook computer. However, the shield is easy to drop. Second is to mechanically move the shielding piece to shield the camera. However, the devices are relatively large, and therefore are difficult to integrate into a body of the camera to realize the miniaturization and integration of the camera/shielding devices.

Thus, a display screen and a display device are urgently required to resolve the above technical problems.

SUMMARY OF INVENTION

In order to resolve the above technical problems, the present disclosure provides a display screen and a display device using the display screen. A blind via area and an under-screen camera can be shielded when a photographing function is disabled, so that the appearance of the display screen is sightlier, the privacy is protected, and the lighting of the under-screen camera is not affected when the photographing function is enabled.

The present disclosure provides a display screen. The display screen has a blind via area. The display screen includes:
 a first polarizing layer, disposed on a light exit side of the display screen, wherein a first opening is provided at a position on the first polarizing layer that corresponds to the blind via area;
 an electrochromic layer, wherein at least part of the electrochromic layer is located in the blind via area, the electrochromic layer is disposed in an array substrate of the display screen or disposed in the first opening, and the electrochromic layer includes:
  a first electrode layer;
  an electrochromic material layer, disposed on the first electrode layer; and
  a second electrode layer, disposed on a side of the electrochromic material layer that is away from the first electrode layer.

Optionally, in some embodiments, the electrochromic layer is disposed in an array substrate of the display screen.

Optionally, in some embodiments, in the blind via area, the array substrate includes:
 a substrate, wherein the electrochromic layer is disposed on the substrate; and
 an alignment layer, disposed on a side of the electrochromic layer that is away from the substrate.

Optionally, in some embodiments, the electrochromic layer is disposed on a light exit side of the display screen.

Optionally, in some embodiments, a first polarizing layer is disposed on the light exit side of the display screen, and a first opening is provided at a position on the first polarizing layer that corresponds to the blind via area. At least part of the electrochromic layer is disposed in the first opening.

Optionally, in some embodiments, the display screen further includes a cover plate. The cover plate is disposed on a side of the first polarizing layer that is away from the display screen.

Optionally, in some embodiments, a second polarizing layer is disposed on a light entry side of the display screen, and a second opening is provided at a position on the second polarizing layer that corresponds to the blind via area.

The present disclosure further provides a display screen. The display screen has a blind via area. The display screen includes an electrochromic layer. At least part of the electrochromic layer is located in the blind via area.

The electrochromic layer includes:
 a first electrode layer;
 an electrochromic material layer, disposed on the first electrode layer; and
 a second electrode layer, disposed on a side of the electrochromic material layer that is away from the first electrode layer.

Optionally, in some embodiments, the electrochromic layer is disposed in an array substrate of the display screen.

Optionally, in some embodiments, in the blind via area, the array substrate includes:
 a substrate, wherein the electrochromic layer is disposed on the substrate; and
 an alignment layer, disposed on a side of the electrochromic layer that is away from the substrate.

Optionally, in some embodiments, the electrochromic layer is disposed on a light exit side of the display screen.

Optionally, in some embodiments, a first polarizing layer is disposed on the light exit side of the display screen, and a first opening is provided at a position on the first polarizing layer that corresponds to the blind via area. At least part of the electrochromic layer is disposed in the first opening.

Optionally, in some embodiments, the display screen further includes a cover plate. The cover plate is disposed on a side of the first polarizing layer that is away from the display screen.

Optionally, in some embodiments, a second polarizing layer is disposed on a light entry side of the display screen, and a second opening is provided at a position on the second polarizing layer that corresponds to the blind via area.

The present disclosure further provides a display device. The display device includes a display screen and a camera.

The display screen has a blind via area. The display screen includes an electrochromic layer. At least part of the electrochromic layer is located in the blind via area. The electrochromic layer includes:
- a first electrode layer;
- an electrochromic material layer, disposed on the first electrode layer; and
- a second electrode layer, disposed on a side of the electrochromic material layer that is away from the first electrode layer.

The camera is located on a light entry side of the display screen, and corresponds to the blind via area of the display screen.

Optionally, in some embodiments, the display device includes a backlight module located on the light entry side of the display screen, and a third opening is provided at a position on the backlight module that corresponds to the blind via area of the display screen.

Optionally, in some embodiments, at least part of the camera is located in the third opening.

Optionally, in some embodiments, at least part of the camera is located in the third opening and a second opening.

Compared with the related art, according to the display screen and the display device of the present disclosure, the electrochromic layer is disposed in the blind via area of the display screen. Since the electrochromic layer can be switched between a chromogenic state and a transparent state after being powered on, the blind via area and the camera can be shielded when a photographing function is disabled, so that the appearance is sightlier, and the privacy is protected. In addition, when the photographing function is enabled, the electrochromic layer is switched to the transparent state, so that the light can penetrate the electrochromic layer, and the transparent housing has an appearance with changed colors during displaying. Moreover, the electrochromic layer of the present disclosure is integrated in the blind via area of the display screen, so that the thickness of the display screen is not increased.

DETAILED DESCRIPTION OF PREFERRED EMBODIMENTS

The present disclosure provides a display screen and a display device. To make the objectives, technical solutions, and effects of the present disclosure clearer and more explicit, the following further describes the present disclosure in detail with reference to the accompanying drawings and embodiments. It is to be understood that the specific embodiments described herein are merely used for describing the present disclosure but are not intended to limit the present disclosure.

Figure 2:
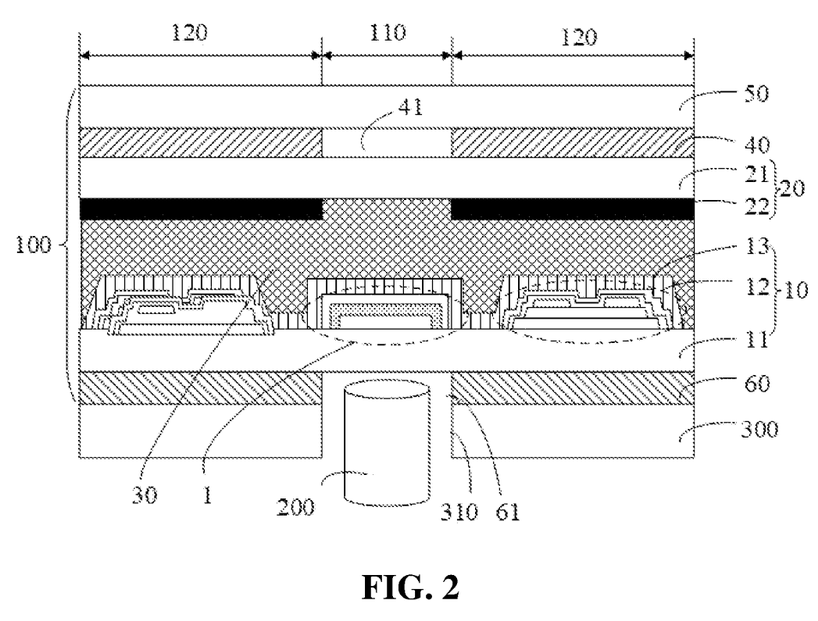
FIG. 2 is a schematic diagram of a first embodiment of a display device according to the present disclosure.
Figure 3:
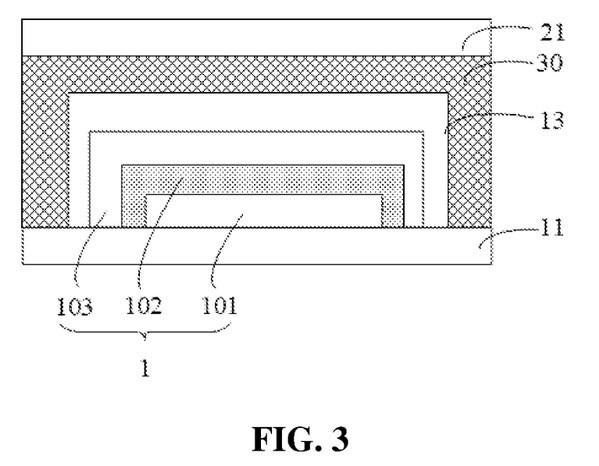
FIG. 3 is a detailed enlarged view of FIG. 2.
Figure 4:
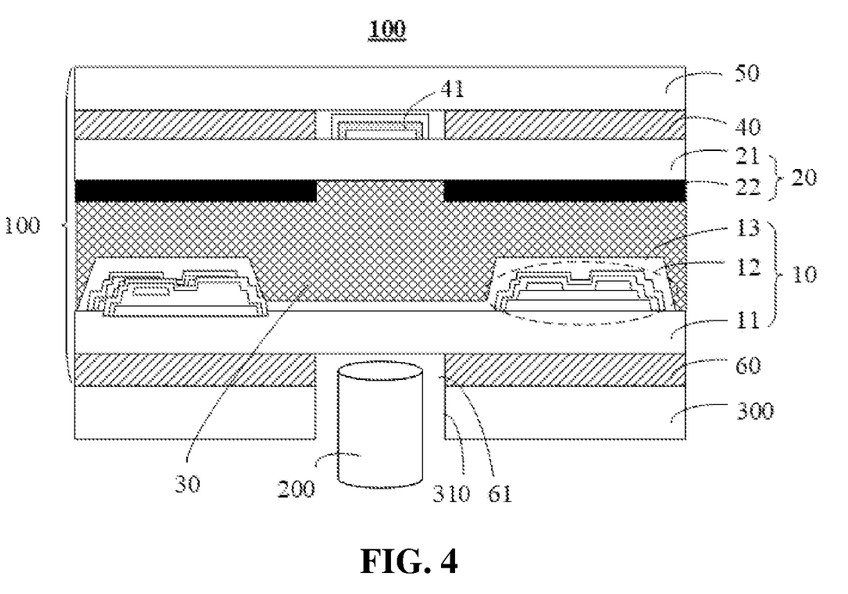
FIG. 4 is a schematic diagram of a second embodiment of a display device according to the present disclosure.
Figure 5:
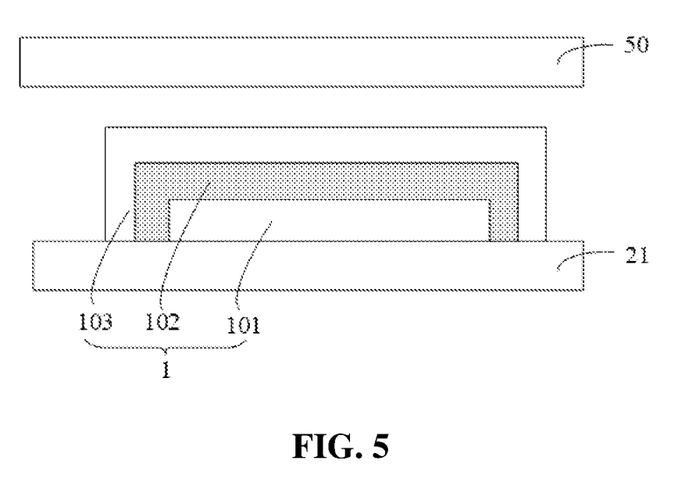
FIG. 5 is a detailed enlarged view of FIG. 4.

FIG. 2 is a schematic diagram of a first embodiment of a display device according to the present disclosure. FIG. 4 is a schematic diagram of a second embodiment of a display device according to the present disclosure. FIGS. 3 and 5 are detailed enlarged views of FIGS. 2 and 4, respectively. A difference between the display device shown in FIGS. 2 and 3 and the display device shown in FIGS. 4 and 5 lies in a different position of an electrochromic layer 1. A display screen 100 of the present disclosure and a structure of a display device using the display screen 100 are described in detail below with reference to FIGS. 2 to 5.

As shown in FIGS. 2 and 3, the display screen 100 of the present disclosure has a blind via area 110 and a non-blind via area 120. The display screen 100 includes an electrochromic layer 1. At least part of the electrochromic layer 1 is located in the blind via area 110. The electrochromic layer 1 includes a first electrode layer 101, an electrochromic material layer 102, and a second electrode layer 103. The electrochromic material layer 102 is disposed on the first electrode layer 101. The second electrode layer 103 is disposed on a side of the electrochromic material layer 102 that is away from the first electrode layer 101.

To all appearances, the electrochromic layer 1 has a chromogenic state and a transparent state. In the chromogenic state, the electrochromic layer 1 can shield the blind via area 110. In the transparent state, the electrochromic layer 1 allows light to penetrate the blind via area 110.

According to the display screen 100 of the present disclosure, the electrochromic layer 1 is disposed in the blind via area 110 of the display screen 100. Since the electrochromic layer 1 can be switched between the chromogenic state and the transparent state after being powered on, either the blind via area 110 can be shielded, or light can penetrate the blind via area 110. In this way, the appearance is sightlier, and the privacy is protected.

The blind via area 110 is an area from which a plurality of film layers of the display screen 100 are removed to improve the light transmittance of the display screen 100 in the area. During implementation, film layers affecting the penetration of the light in an array substrate or a color filter (CF) substrate are usually removed. The film layers include but are not limited to metal layers or black matrices.

The non-blind via area 120 may be an area configured to display pictures or emit light.

In detail, in the display device of the present disclosure, a camera 200 is integrated on a light entry side (or a non-display side) of the display screen 100, and corresponds to the blind via area 110 of the display screen 100. In this case, external ambient light can enter the camera 200 through the blind via area 110. That is to say, the blind via area 110 may be used as a light inlet of the camera 200.

In the present disclosure, the light entry side (the non-display side) of the display screen 100 is a side through which backlight enters the display screen 100, such as a side of the display screen 100 that faces a backlight module 300. Correspondingly, a light exit side of the display screen 100 is a side through which light exits from the display screen 100, such as a side of the display screen 100 that is away from the backlight module 300.

The electrochromic layer 1 has a chromogenic state and a transparent state. In the chromogenic state, the blind via area 110 (the light inlet of the camera 200) is shielded by the electrochromic layer 1. In the chromogenic state, the electrochromic layer 1 can cause the blind via area 110 to present an overall same color as other surrounding elements, so that the appearance integrity of a mobile terminal or the display screen 100 is not affected by the arranged camera in the chromogenic state. In the transparent state, the ambient light can penetrate the blind via area 110 (the light inlet of the camera 200) and be incident on the light inlet of the camera 200. The light entering the light inlet may be further incident on a photosensitive element of the camera 200. In other words, functions of the camera 200 are not affected when the electrochromic layer 1 is in the transparent state.

It may be learned that, according to the solutions of the present disclosure, the electrochromic layer 1 is disposed in the blind via area 110 of the display screen 100. Since the electrochromic layer 1 can be switched between the chromogenic state and the transparent state after being powered on, the blind via area 110 and the camera can be shielded when the photographing function is disabled, so that the appearance is sightlier, and the privacy is protected. In addition, when the photographing function is enabled, the electrochromic layer 1 is switched to the transparent state, so that the light can penetrate the electrochromic layer, and the transparent housing has an appearance with changed colors during displaying. Moreover, the electrochromic layer 1 of the present disclosure is integrated in the blind via area 110 of the display screen 100, so that the thickness of the display screen 100 is not increased.

In detail, the electrochromic layer 1 of the present disclosure may be disposed in the display screen 100, or may be disposed on the light exit side (a display side) of the display screen 100.

The arrangement of the electrochromic layer 1 of the present disclosure in the display screen 100 is described below in combination with the structures of the display screen 100 and the display device.

As shown in FIGS. 2 and 3, the display screen 100 includes a CF substrate 20, an array substrate 10, and a liquid crystal layer 30. The CF substrate 20 is disposed opposite to the array substrate 10. The liquid crystal layer 30 is sealed between the CF substrate 20 and the array substrate 10.

It is to be noted that, in order to show the structure of the display screen 100 of the present disclosure more intuitively, other film layer structures of the CF substrate 20 and the array substrate 10 are not illustrated in FIGS. 2 and 3. However, those skilled in the art should understand that, the film layer structures actually included in the CF substrate 20 and the array substrate 10 are not limited thereto.

As shown in FIG. 2, the array substrate 10 includes a substrate 11, a plurality of thin film transistors 12, the electrochromic layer 1, and an alignment layer 13.

During implementation, the substrate 11 may be a rigid substrate, such as a substrate made of glass or transparent resin, or may be a flexible substrate, such as a substrate made of polyimide, polycarbonate, polyethylene, polyethylene terephthalate, polyethylene naphthalate, polyarylate, or glass fiber reinforced plastics. In the present embodiment, the substrate is a glass substrate.

As shown in FIG. 2, each thin film transistor 12 is disposed on a side of the substrate 11 that faces the CF substrate 20. The thin film transistor 12 may be configured to perform switch-on/off or driving. In the present disclosure, a type or a structure of the thin film transistor 12 is not limited, and may be changed or selected depending on actual display requirements.

In detail, the thin film transistor 12 may include a gate, an active layer, a source, and a drain. The source and the drain are respectively connected to doped regions on two sides of the active layer. It is to be noted that, a gate insulator may be further disposed between the gate and the active layer, so as to achieve insulation between the gate and the active layer.

As shown in FIG. 2, the thin film transistor 12 is only disposed in the non-blind via area 120, to improve the light transmittance of the blind via area 110, and guarantee the imaging effect of the camera 200.

Further referring to FIG. 2, in the present embodiment, all functional film layers (including a metal layer and the insulating layer) of the thin film transistor 12 avoid the blind via area 110. In this case, in the blind via area 110, the array substrate 10 includes only the substrate 11, the electrochromic layer 1, and the alignment layer 13. In this architecture, undercut structures, such as a groove may be disposed at positions on the non-blind via area 120 that are close to the blind via area 110, to prevent cracks caused by special shape cutting from extending to the non-blind via area 120, so as to enhance the stability of the array substrate 10.

Definitely, in other embodiments, a gate insulator (a gate insulating layer) in the thin film transistor 12 may be designed continuously in the non-blind via area 120, so as to avoid the blind via area 110.

In some other embodiments, the insulating layer in the thin film transistor 12 may be formed as a whole in the blind via area 110 and the non-blind via area 120. In this case, in the blind via area 110, the array substrate 10 includes the substrate 11, the insulating layer disposed on the substrate (that is, the insulating layer of the above thin film transistor 12), the electrochromic layer 1, and the alignment layer 13.

As shown in FIG. 2, the electrochromic layer 1 is disposed on a side of the substrate 11 that faces the CF substrate 20. The electrochromic layer 1 is located in the blind via area 110.

In detail, an orthographic projection of the electrochromic layer 1 on the display screen 100 completely covers the blind via area 110. That is to say, a size of the electrochromic layer 1 equals or exceeds a size of the blind via area 110.

In detail, the electrochromic layer 1 extends continuously from the blind via area 110 to the non-blind via area 120.

As shown in FIG. 3, the present disclosure provides an implementation of the electrochromic layer 1. As shown in FIG. 3, the electrochromic layer 1 includes a first electrode layer 101, an electrochromic material layer 102, and a second electrode layer 103 stacked in sequence.

Still referring to FIG. 3, the first electrode layer 101 is disposed on a side of the thin film transistor 12 layer that faces the CF substrate 20. The electrochromic material layer 102 is disposed on a side of the first electrode layer 101 that is away from the substrate 11. The electrochromic material layer 102 covers an entire outer surface of the first electrode layer 101. The second electrode layer 103 is disposed on a side of the electrochromic material layer 102 that is away from the first electrode layer 101. The second electrode layer 103 covers an entire outer surface of the electrochromic material layer 102.

Still referring to FIG. 3, the first electrode layer 101 and the second electrode layer 103 are insulated from each other, and are configured to lead to a control circuit of the electrochromic layer 1. The control circuit may be further electrically connected to a driving structure of the display screen 100 by using a wire, a metallic contact, or the like.

During implementation, the first electrode layer 101 and the second electrode layer 103 both use a transparent electrode material having relatively high light transmittance, so as to improve the entire light transmittance of the electrochromic layer 1. The electrode material may be but is not limited to indium tin oxide (ITO), indium zinc oxide (IZO), or zinc oxide (ZnO).

The electrochromic material layer 102 may be made of an electrochromic material, such as $WO_x$, $WNiO_x$, polyaniline, poly(3,4-ethylenedioxythiophene) (PEDOT), or the like. By virtue of the optical properties (such as reflectivity, transmittance, absorptivity, and so on) of the electrochromic material, a color of the electrochromic material may change stably and reversibly under the action of an external electric field. Therefore, the appearance of the electrochromic material changes reversibly in color and transparency.

In some embodiments, partial film layers of the electrochromic layer 1 may be manufactured in the manufacturing process of the array substrate 10. For example, the array substrate 10 further includes a pixel electrode disposed on the side of the thin film transistor 12 layer that faces the CF substrate 20. The first electrode layer 101 and the pixel electrode are disposed in a same layer. In the manufacturing process, the first electrode layer 101 and the pixel electrode may be obtained from a same transparent electrode film layer. In this way, both the first electrode layer 101 and the pixel electrode can be formed in one composition process, so that process steps and masks required for manufacturing the display screen 100 are reduced. Therefore, the time the costs require for manufacturing the display screen 100 are reduced.

In other embodiments, the electrochromic layer 1 may further include an ion storage layer or an ion transport layer.

As shown in FIG. 2, the alignment layer 13 is disposed on the side of the thin film transistor 12 that faces the CF substrate 20.

As shown in FIG. 2, the CF substrate 20 includes a substrate 21 and a plurality of black matrices 22.

During implementation, the substrate 21 may be a rigid substrate, such as a substrate made of glass or transparent resin, or may be a flexible substrate, such as a substrate made of polyimide, polycarbonate, polyethylene, polyethylene terephthalate, polyethylene naphthalate, polyarylate, or glass fiber reinforced plastics. In the present embodiment, the substrate is a glass substrate.

As shown in FIG. 2, each black matrix 22 is disposed on a side of the substrate 21 that faces the array substrate 10. The black matrix 22 is configured to shield a metallic structure, such as the thin film transistor 12, a grid line, or a trace disposed in the array substrate 10.

In detail, in order to avoid affecting the light transmittance of the blind via area 110, the black matrix 22 is disposed in the non-blind via area 120. That is, the black matrix 22 is disposed in a way such that the black matrix avoids the blind via area 110.

That is to say, the black matrix 22 has a hollowed-out area at a position corresponding to the blind via area 120. In some other embodiments, the electrochromic layer 1 may be disposed in the hollowed-out area.

During implementation, the black matrix 22 may be made of a black matrix 22 material. The black matrix 22 material may be opaque materials, such as black photoresist containing carbon black.

In detail, the CF substrate 20 further includes a color photoresist layer (not shown in the figure). The color photoresist layer further includes a plurality of color resist blocks spaced apart from each other. Light of the display screen 100 exits after passing through the color resist blocks of the color photoresist layer, to visually display colors corresponding to the color resist blocks, so that the display screen 100 displays a required picture.

As shown in FIG. 1, the color photoresist layer includes a red color resist block, a green color resist block, and a blue color resist block. During implementation, the color resist blocks having different colors may be made of color resist materials having different colors. For example, the red color resist block, the green color resist block, and the blue color resist block may be respectively made of a red color resist material, a green color resist material, or a blue color resist material.

In the present embodiment, the red color resist block, the green color resist block, and the blue color resist block are arranged in sequence according to a specific rule. For example, the red color resist block, the green color resist block, and the blue color resist block may be arranged according to red-green-blue, red-green-blue, or red-green-blue. Definitely, the red color resist block, the green color resist block, and the blue color resist block may be arranged depending on other optical requirements, which are not enumerated herein. In brief, the CF substrate 20 is properly configured to guarantee a normal display function of the display screen 100.

In detail, the color resist block is disposed between the adjacent black matrices 22. That is to say, an orthographic projection of the black matrix 22 on the color photoresist layer is located between the color resist blocks, so as to avoid light leakage and increase a contrast.

In some embodiments, the CF substrate 20 further includes a planarization layer and an alignment layer. The planarization layer may cover the black matrix 22 and the color photoresist layer, and can planarize surfaces of the black matrix 22 and the color photoresist layer.

The alignment layer on the CF substrate 20 side is disposed on a side of the planarization layer that faces the array substrate 10, and is mated with the alignment layer 13 on the array substrate 10, so that a liquid crystal of the liquid crystal layer 30 obtains a pretilt angle.

In detail, the liquid crystal layer 30 is sealed between the array substrate 10 and the CF substrate 20. The liquid crystal layer 30 includes at least liquid crystals.

In other embodiments, the liquid crystal layer 30 further includes a support post. Two ends of the support post for supporting are respectively in contact with the CF substrate 20 and the array substrate 10. It may be understood by those skilled in the art that, in order to guarantee the light transmittance of the blind via area 110, the support post is disposed in the non-blind via area 120. It is to be understood that, in the blind via area 110, the liquid crystal layer 30 includes only the liquid crystals.

Still referring to FIGS. 2 and 3, the display screen 100 further includes a first polarizing layer 40, a cover plate 50, and a second polarizing layer 60.

Referring to FIG. 2, the first polarizing layer 40 is disposed on the light exit side of the display screen 100.

Referring to FIG. 2, in the present embodiment, the first polarizing layer 40 is disposed on a side of the CF substrate 20 that is away from the array substrate 10. That is, the first polarizing layer 40 is disposed on a side of the substrate 21 that is away from the black matrix 22.

Referring to FIG. 2, a first opening 41 is formed at a position on the first polarizing layer 40 that corresponds to the blind via area 110. By means of the first opening 41, the light transmittance of the blind via area 110 can be enhanced, thereby enhancing the light trapping capability of the camera 200 and the photographing quality.

In detail, a size of the first opening 41 is greater than or equal to a size of the blind via area 110. In other words, an orthographic projection of the first opening 41 on the display screen 100 overlaps the blind via area 110 or exceeds the blind via area 110. In the present disclosure, a shape of the first opening 41 is not limited. For example, the shape of the first opening 41 may include but is not limited to a circular shape or a rectangular shape.

In order to further increase the transmittance and enhance the display quality, an included angle between an absorption axis of the first polarizing layer 40 and a direction of a long axis of liquid crystal molecules in the display screen 100 is at least one of 45 degrees, 135 degrees, 225 degrees, and 315 degrees. That is to say, when the included angle between the absorption axis of the first polarizing layer 40 and the direction of the long axis of liquid crystal molecules in the display screen is any of the above angles, the optimal display quality in a dark state is achieved. A transparent display panel (such as a liquid crystal display (LCD) in a vertical alignment (VA) mode) is in a dark state when not being driven.

During implementation, the first polarizing layer 40 may be attached to a surface on the light exit side of the display screen 100 using an optically clear adhesive (OCA).

Referring to FIG. 2, the cover plate 50 is disposed on a side of the first polarizing layer 40 that is away from the display screen 100. The cover plate 50 covers the first polarizing layer 40.

In detail, the cover plate 50 is a single-layer structure or a multi-layer laminated structure made of fully transparent glass or other transparent materials. During implementation, the cover plate 50 may be attached to the first polarizing layer 40 using the OCA.

In the present embodiment, the cover plate 50 is a flexible cover plate 50. The flexible cover plate 50 includes a flexible substrate and a hardened thin film layer stacked on the flexible substrate. The flexible substrate may be made of high polymer materials, such as polyimide (PI), a cyclo olefin polymer (COP), or polyethylene terephthalate (PET). A thickness of the flexible substrate generally does not exceed 50 μm, so as to guarantee a relatively desirable bending characteristic of the flexible cover plate 50. The hardened thin film layer is a thin film structure deposited on a surface of the flexible substrate. A thickness of the hardened thin film layer generally does not exceed 10 μm. By means of the hardened thin film layer, the strength of the flexible cover plate 50 can be increased, so that shatter-resistant, wear-resistant, waterproof, and other characteristics of the flexible cover plate 50 are realized.

Referring to FIG. 2, the second polarizing layer 60 is disposed on the light entry side of the display screen 100.

In the present disclosure, the second polarizing layer 60 is disposed on a side of the array substrate 10 that is away from the CF substrate 20. That is, the second polarizing layer 60 is disposed on a side of the substrate 11 that is away from the thin film transistor 12 layer.

Referring to FIG. 2, a second opening 61 is formed at a position on the second polarizing layer 60 that corresponds to the blind via area 110. By means of the second opening 61, the light transmittance of the blind via area 110 can be enhanced, thereby enhancing the light trapping capability of the camera 200 and the photographing quality.

In detail, the second opening 61 may be further configured to accommodate the camera 200. In this way, a thickness and a size of an under-screen camera device are reduced.

Definitely, in some other embodiments, the second opening 61 may be further configured to dispose the electrochromic layer 1 therein. In other words, at least part of the electrochromic layer 1 is disposed in the second opening 61.

In detail, a size of the second opening 61 is greater than or equal to the size of the blind via area 110. In other words, an orthographic projection of the second opening 61 on the display screen 100 overlaps the blind via area 110 or exceeds the blind via area 110. In the present disclosure, a shape of the second opening 61 is not limited. For example, the shape of the second opening 61 may include but is not limited to a circular shape or a rectangular shape.

FIGS. 4 and 5 are schematic diagrams of a second embodiment of a display screen 100 according to the present disclosure. Compared with the display screen 100 in FIGS. 2 and 3, the biggest difference of the display screen 100 in FIGS. 4 and 5 lies in that, the electrochromic layer 1 is disposed on the light exit side of the display screen 100.

Referring to FIGS. 4 and 5, in the present embodiment, the electrochromic layer 1 is disposed in the first opening 41 of the first polarizing layer 40.

Compared with the display device in FIG. 2, the electrochromic layer 1 is filled in the first opening 41 of the first polarizing layer 40. Therefore, by means of the electrochromic layer 1 in the chromogenic state, the blind via area 110 and the non-blind via area 120 are more consistent when observed from a display side, so that the appearance of the display screen 100 is more integrated.

Referring to FIG. 5, in the present embodiment, the first electrode layer 101, the electrochromic material layer 102, and the second electrode layer 103 of the electrochromic layer 1 are stacked on a surface on a light exit side of the substrate of the CF substrate 20 in sequence.

In this case, the electrochromic layer 1 is located in an enclosed space formed by the substrate, the first polarizing layer 40, and the cover plate 50, so that an internal space of the display screen 100 can be utilized to a largest extent, and the electrochromic layer 1 can be sealed and protected.

Based on a same inventive concept, the present disclosure further provides a display device. The display device includes the display screen 100 and the camera 200 of the present disclosure.

The camera 200 is disposed on the light entry side of the display screen 100. The camera 200 corresponds to the blind via area 110 of the display screen 100.

Referring to FIGS. 2 and 4, a part of the camera 200 is accommodated in the second opening 61 of the second polarizing layer 60. In this way, the thickness of the display device can be reduced.

Still referring to FIGS. 2 and 4, the display device further includes a backlight module 300. The backlight module 300 is disposed on the light entry side of the display screen 100. A third opening 310 is formed at a position on the backlight module 300 that corresponds to the blind via area 110 of the display screen 100. By means of the third opening 310, the light transmittance of the blind via area 110 can be enhanced, and the camera 200 can be prevented from being affected by light from the backlight module 300.

In addition, the third opening 310 may be further configured to accommodate the camera 200, so as to reduce a thickness of an under-screen camera device.

Referring to FIGS. 2 and 4 together, in the present embodiment, the backlight module 300 is disposed on a side of the second polarizing layer 60 that is away from the first polarizing layer 40. At least part of the camera 200 is accommodated in the second opening 61 and the third opening 310.

In other embodiments, the camera 200 may be disposed in the third opening 310. That is to say, in the present disclosure, the position of the camera 200 is not limited.

It is to be understood that, for a person of ordinary skill in the art, equivalent replacements or changes may be made to the technical solutions of the present disclosure and the inventive concept thereof, and such changes or equivalent replacements shall fall within the protection scope of the appended claims of the present disclosure.

What is claimed is:
1. A display screen, having a blind via area, wherein the display screen comprises:

a first polarizing layer disposed on a light exit side of the display screen, wherein a first opening is provided at a position on the first polarizing layer corresponding to the blind via area; and an electrochromic layer, wherein at least part of the electrochromic layer is located in the blind via area, the electrochromic layer is disposed in an array substrate of the display screen or disposed in the first opening, and the electrochromic layer comprises:

a first electrode layer;

an electrochromic material layer disposed on the first electrode layer; and a second electrode layer disposed on a side of the electrochromic material layer away from the first electrode layer;

wherein in the blind via area, the array substrate comprises:

a substrate, wherein the electrochromic layer is disposed on the substrate; and an alignment layer disposed on a side of the electrochromic layer away from the substrate.

2. The display screen as claimed in claim 1, wherein the display screen further comprises a cover plate, and the cover plate is disposed on a side of the first polarizing layer away from the display screen.

3. The display screen as claimed in claim 1, wherein a second polarizing layer is disposed on a light entry side of the display screen, and a second opening is provided at a position on the second polarizing layer corresponding to the blind via area.

4. A display screen, having a blind via area, wherein the display screen comprises an electrochromic layer, and at least part of the electrochromic layer is located in the blind via area; and wherein the electrochromic layer comprises:

a first electrode layer;

an electrochromic material layer, disposed on the first electrode layer; and a second electrode layer, disposed on a side of the electrochromic material layer away from the first electrode layer, wherein the electrochromic layer is disposed in an array substrate of the display screen, and in the blind via area, the array substrate comprises:

a substrate, wherein the electrochromic layer is disposed on the substrate; and an alignment layer, disposed on a side of the electrochromic layer away from the substrate.

5. The display screen as claimed in claim 1, wherein the electrochromic layer is disposed on a light exit side of the display screen.

6. The display screen as claimed in claim 5, wherein a first polarizing layer is disposed on the light exit side of the display screen, a first opening is provided at a position on the first polarizing layer corresponding to the blind via area, and at least part of the electrochromic layer is disposed in the first opening.

7. The display screen as claimed in claim 6, wherein the display screen further comprises a cover plate, and the cover plate is disposed on a side of the first polarizing layer away from the display screen.

8. The display screen as claimed in claim 4, wherein a second polarizing layer is disposed on a light entry side of the display screen, and a second opening is provided at a position on the second polarizing layer corresponding to the blind via area.

9. A display device, comprising a display screen and a camera, wherein the display screen has a blind via area and comprises an electrochromic layer, at least part of the electrochromic layer is located in the blind via area, and the electrochromic layer comprises:

a first electrode layer;

an electrochromic material layer, disposed on the first electrode layer; and a second electrode layer, disposed on a side of the electrochromic material layer that is away from the first electrode layer, wherein the camera is located on a light entry side of the display screen and corresponds to the blind via area of the display screen;

wherein the electrochromic layer is disposed in an array substrate of the display screen, and in the blind via area, the array substrate comprises:

a substrate, wherein the electrochromic layer is disposed on the substrate; and an alignment layer, disposed on a side of the electrochromic layer away from the substrate.

10. The display device as claimed in claim 9, wherein the display device comprises a backlight module located on the light entry side of the display screen, and a third opening is provided at a position on the backlight module corresponding to the blind via area of the display screen.

11. The display device as claimed in claim 10, wherein at least part of the camera is located in the third opening.

12. The display device as claimed in claim 10, wherein at least part of the camera is located in the third opening and a second opening.

* * * * *